United States Patent
Yamamoto et al.

(10) Patent No.: US 6,683,650 B1
(45) Date of Patent: Jan. 27, 2004

(54) DIGITAL CAMERA

(75) Inventors: Shigeaki Yamamoto, Itami (JP); Takashi Fujita, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/162,772

(22) Filed: Sep. 30, 1998

(30) Foreign Application Priority Data

Oct. 2, 1997  (JP) ............................................. 9-269490

(51) Int. Cl.⁷ ....................... H04N 5/222; H04N 5/445; H04N 5/50
(52) U.S. Cl. .......................... 348/333.12; 348/333.02; 348/563; 348/569
(58) Field of Search ............................ 348/239, 333.01, 348/333.02, 333.12, 563, 569; 345/87–102, 690, 173, 700

(56) References Cited

U.S. PATENT DOCUMENTS

| | | | | |
|---|---|---|---|---|
| 5,386,247 A | * | 1/1995 | Shafer et al. | 348/563 |
| 5,488,414 A | * | 1/1996 | Hirasawa et al. | 348/207.1 |
| 5,559,554 A |   | 9/1996 | Uekane et al. | 348/333 |
| 5,579,057 A | * | 11/1996 | Manker et al. | 348/589 |
| 5,631,711 A | * | 5/1997 | Yang | 348/563 |
| 5,652,930 A | * | 7/1997 | Teremy et al. | 396/287 |
| 5,828,420 A | * | 10/1998 | Marshall et al. | 348/564 |
| 5,845,166 A | * | 12/1998 | Fellegara et al. | 348/64 |
| 5,870,143 A | * | 2/1999 | Suzuki | 348/333.02 |
| 6,055,381 A | * | 4/2000 | Maruyama | 348/333 |
| 6,064,765 A | * | 5/2000 | Hirayama | 345/121 |
| 6,111,614 A | * | 8/2000 | Mugura et al. | 348/569 |
| 6,118,480 A | * | 9/2000 | Anderson et al. | 348/333 |
| 6,133,962 A | * | 10/2000 | Proehl et al. | 348/569 |
| 6,147,714 A | * | 11/2000 | Terasawa et al. | 348/564 |
| 6,201,571 B1 | * | 3/2001 | Ota | 348/239 |
| 6,342,900 B1 | * | 1/2002 | Ejima et al. | 348/333.01 |

FOREIGN PATENT DOCUMENTS

| | | |
|---|---|---|
| JP | 57-176782 | 11/1982 |
| JP | 63-77276 | 4/1988 |
| JP | 63-077276 | 4/1988 |
| JP | 4-30677 | 3/1992 |
| JP | 5-336484 | 12/1993 |
| JP | 6-19444 | 1/1994 |
| JP | 06-105193 | 4/1994 |
| JP | 8-6550 | 1/1996 |
| JP | 8-86996 | 4/1996 |
| JP | 08-086996 | 4/1996 |
| JP | 8-181915 | 7/1996 |
| JP | 08-205014 | 8/1996 |

OTHER PUBLICATIONS

DATABASE WPI; Section EI, Week 9638; Derwent Publications Ltd., London, GB; Class W04, AN 96–377609 XP002087284 & JP 08 181915 A (Kyocera Corp), Jul. 12, 1996 *abstract*.

DATABASE WPI; Section EI, Week 9404; Derwent Publications Ltd., London, GB; Class W04; AN 96–030522 XP002087285 & UP 336484 A (Konica Corp), Dec. 17, 1993 *abstract*.

* cited by examiner

*Primary Examiner*—Wendy R. Garber
*Assistant Examiner*—Lin Ye
(74) *Attorney, Agent, or Firm*—Westerman, Hattori, Daniels & Adrian, LLP

(57) ABSTRACT

A digital camera includes an LCD to display a photographic image. If an operator manipulates a menu button during displaying a memory-reproduced photographic image on the LCD, a menu icon is displayed by superposition on the photographic image being displayed. Simultaneously, the photographic image is reduced in luminance. If the operator operates an image switching button, the photographic image being displayed is renewed by a desired photographic image. During renewal, the icon is suspended of display and the photographic image is increased in luminance. When the renewal is completed, the photographic image is reduced in luminance again and the icon is redisplayed.

16 Claims, 13 Drawing Sheets

(A)  (B)

IMAGE SELECTABLE

| PUSHING INVALID FOR IMAGE PROTECTED |

(C)

(A)

(B)

(C)

(A)

IMAGE SELECTABLE (B)

(C)

DIGITAL CAMERA

BACKGROUND OF THE INVENTION

1. Field of the Invention

This invention relates to digital cameras and, more particularly, to a digital camera which is adapted to superpose character images on a photographic image being displayed, for example, on an LCD, according to a character display command.

2. Description of the Prior Art

In the conventional digital cameras of this kind, where character images such as icons are superposed on a photographic image displayed on an LCD, the character and photographic image are displayed at a same luminance level.

This, however, makes the character image and the photographic image difficult to distinguish therebetween, thus raising a problem of encountering difficulty in recognizing the character images.

SUMMARY OF THE INVENTION

Therefore, it is a primary object of this invention to provide a novel digital camera.

It is another object of this invention to provide a digital camera which is easy to recognize a character image superposed on a photographic image.

According to the present invention, a digital camera comprising: an image monitor; a display means which displays a photographic image on said image monitor; an input means which inputs a character display command; a superposing means which superposes a character image on the photographic image in response to the character display command; and a first luminance reducing means which reduces a luminance of the photographic image in response to the character display command.

If a character display command is inputted during displaying a photographic image on the image monitor, the superposing means superposes a character image on the photographic image in response to the character display command. Also, the first luminance reducing means lowers the luminance of the photographic image in response to the character display command.

In one aspect of the present invention, the photographic image is a still image reproduced from a memory. The luminance of the photographic image lowered by the first luminance reducing means is increased by the first luminance increasing means for a predetermined time period from a start of renewing the photographic image by the renewing means.

In one embodiment of the present invention, image data of the photographic image compressed by a predetermined method is stored in a memory. This compressed image data is decompressed by the predetermined method by a decompressing means during renewal.

In another embodiment of the present invention, a display suspending means suspends display of the character and the photographic image prior to renewal. The character suspended of display is redisplayed by the character redisplay means after a lapse of a predetermined time period. Incidentally, the predetermined time period is a time period requiring the renewal.

In another embodiment of the present invention, if an erasing means erases the photographic image recorded in the memory, the first enabling means enables the enabling means. When an instructing means instructs to switch the photographic image being displayed on the image monitor, the second enabling means enables the renewing means.

In another aspect of the present invention, if the canceling means cancels the display of the character image, the second luminance increasing means increases the luminance of the photographic image.

According to the present invention, since the photographic image displayed on the image monitor is reduced according to the character display command, the character image is easy to recognize.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2(A) is an illustrative view showing a main switch, while FIG. 2(B) is a view illustrating a menu button;

DETAILED DESCRIPTION OF THE PREFERRED EMBODIMENTS

Figure 1:
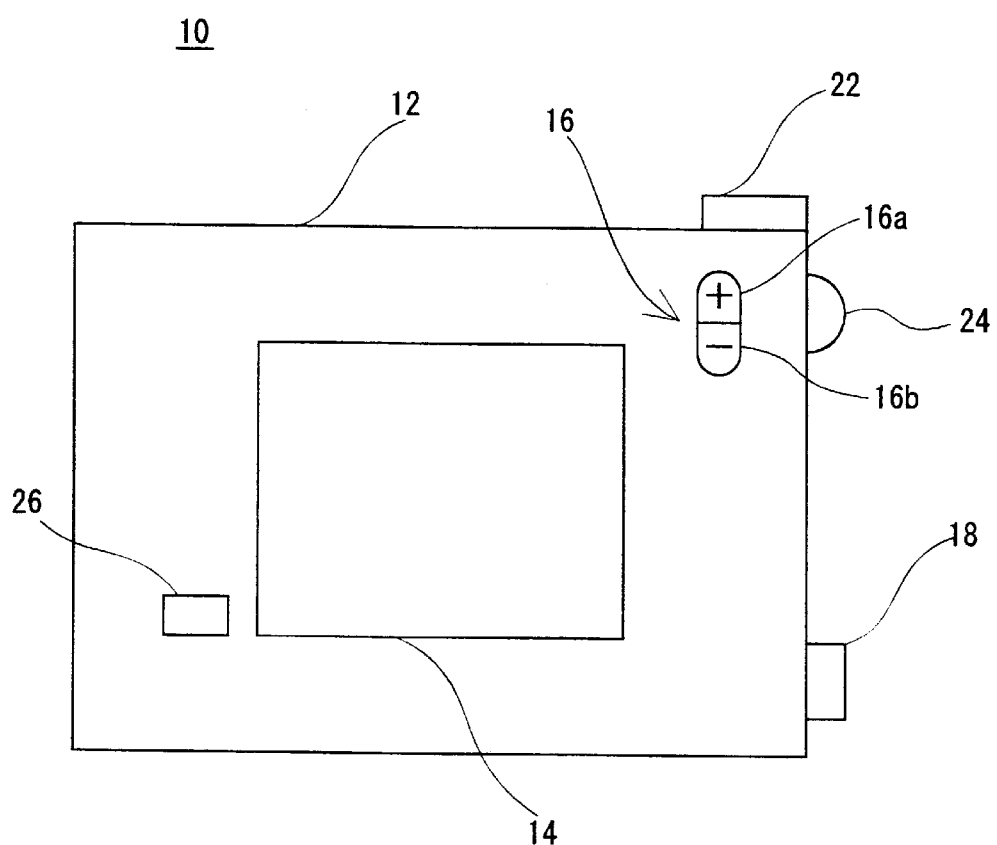
FIG. 1 is an illustrative view showing one embodiment of this invention.

Referring first to FIG. 1, a digital camera 10 of this embodiment includes a liquid crystal display (LCD) 14 provided in a back surface of a main body 12 to display photographic images. An image switching button 16 is arranged at a location of upper right with respect to the LCD 14. In a reproduce mode, if this image switching button 16 is operated while a desired photographic image (still image) is being reproduced from a memory card 70 shown in FIG. 8, renewal is made for the photographic image being displayed on the LCD 14. That is, if a + button 16a is depressed once, a photographic image next to the current photographic image is reproduced from the memory card 70. If a − button 16b is depressed once, a photographic image preceding to the current photographic image is reproduced from the memory card 70. In a camera mode, on the other hand, photographic images (motion images) are displayed in real time on the LCD. Further, when a shutter button 22 provided on a top surface of the main body 12 is operated, a photographic image taken is recorded on the memory card 70. Note that the term "photographic image" means a still image to be reproduced from the memory card 70 in the reproduce mode, besides real-time motion images taken in the camera mode.

Figure 2:
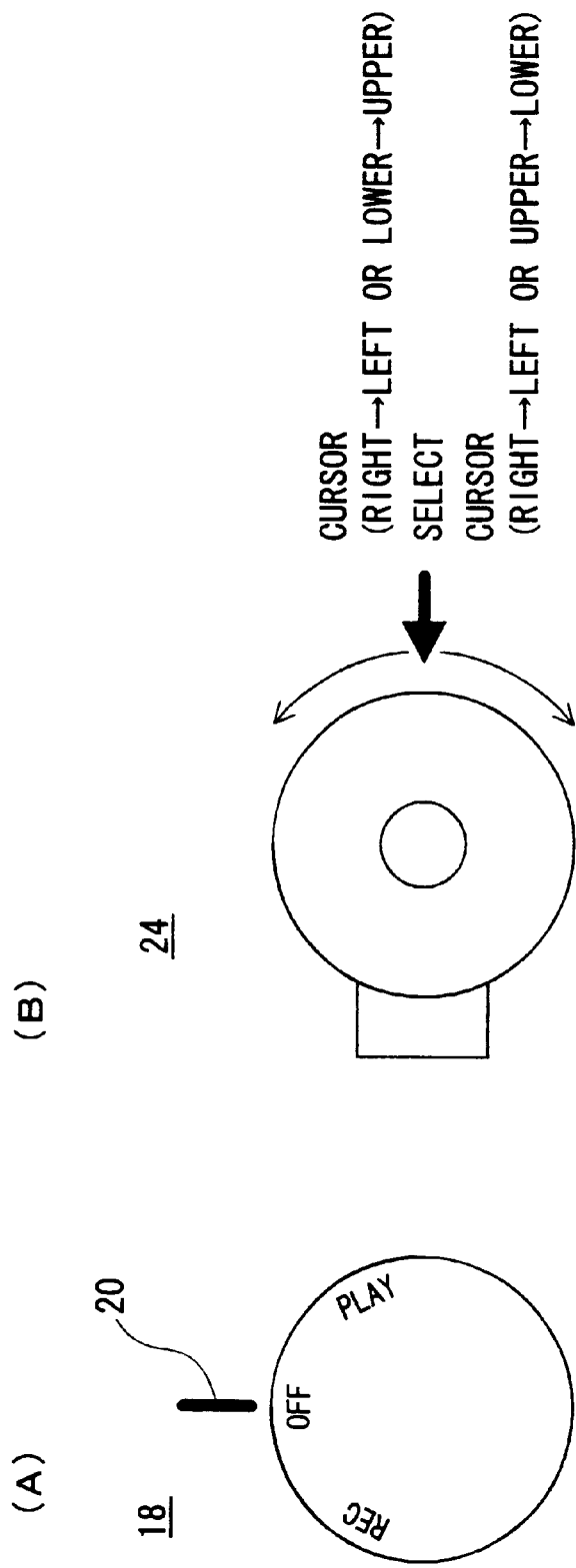

A main switch 18 is arranged on a right face of the main body 12. This main switch 18 is configured as shown in FIG. 2(A), wherein if "OFF" is aligned to a mark provided on the side face, power supply is turned off. If "PLAY" is aligned to the mark 20, a reproduce mode is established, while a camera mode is established when "REC" is positioned to the mark 20.

A menu button 24 of a dial type, as shown in FIG. 2(B), is also provided on the side face of the main body 12. When this menu button 24 is depressed once in a direction toward the main body 12, an icon indicative of a menu is superposed and displayed on the LCD 14. In this state, if the menu button 24 is rotated leftward, a cursor moves in a direction from right to left or from bottom to top. If the menu button 24 is rotated rightward, the cursor moves from left to right or from top to bottom. If the menu button 24 is depressed when the cursor is pointing at a desired icon, the icon designated by the cursor is selected.

Figure 3:
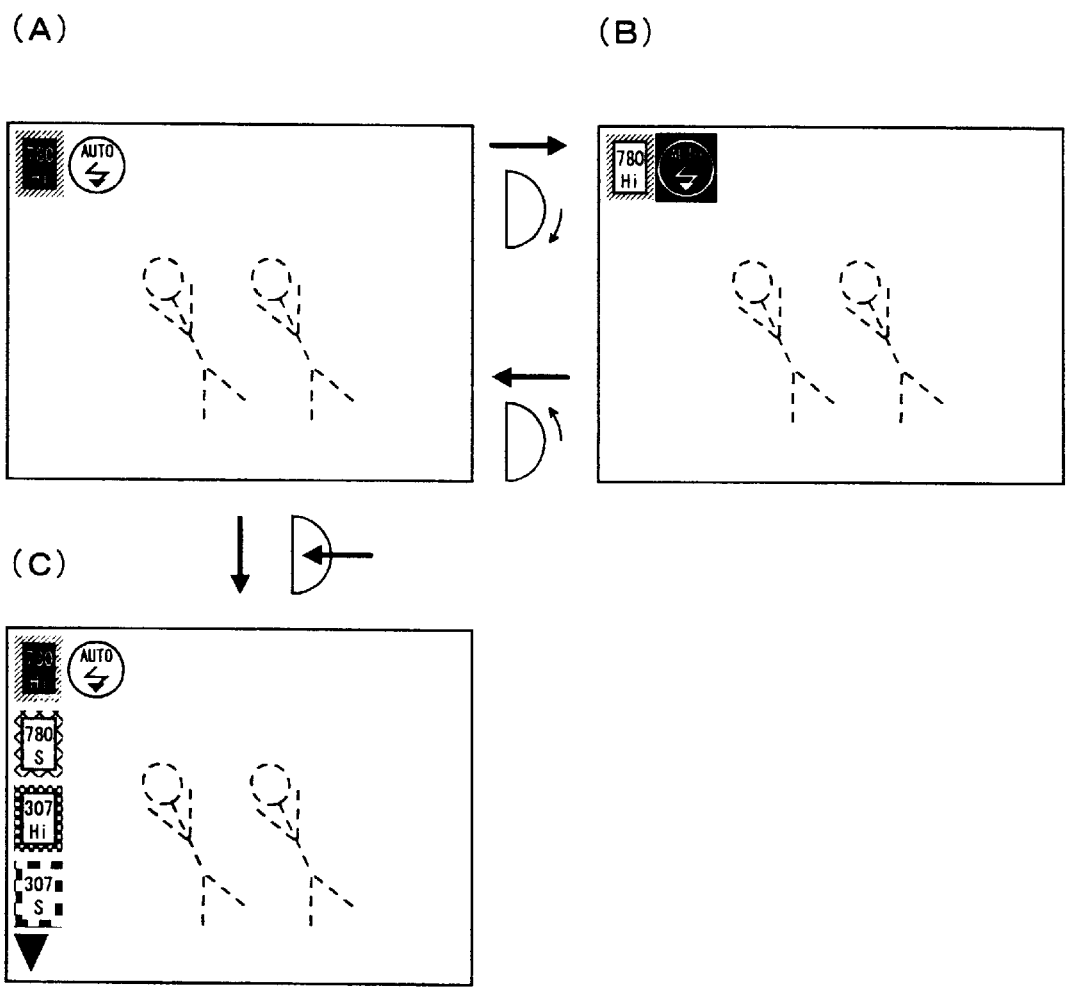
FIG. 3 is an illustrative view showing part of a camera mode operation in the FIG. 1 embodiment.

The operation upon manipulating the menu button 24 will be explained in detail. In the camera mode, an icon as shown in FIG. 3 is displayed. When the menu button 24 is depressed once, icons for selecting a resolution and flash mode are displayed as shown in FIG. 3(A). At this time, the cursor will first point the resolution icon. If the menu button 24 is rotated rightward, the cursor then points at the flash mode icon as shown in FIG. 3(B). In this state, if the menu button 24 is depressed, then a flash mode is established. In this mode, a flash is fired by depressing the shutter button 22. When the menu button 24 is rotated leftward, the cursor returns to a position as shown in FIG. 3(A). At this time, if the menu button 24 is depressed, a plurality of icons indicative of different resolutions are displayed as shown in FIG. 3(C). In this manner, a desired resolution is set by rotating the menu button 24 and depressing it when the cursor points at a desired icon.

In the camera mode, menu is displayed in this way. The photographic image (motion image) on the LCD 14 is reduced in luminance during displaying the menu. That is, the luminance of the photographic image is at a normal level before performing superposition of a menu on the LCD 14 in accordance with operation of the menu button 24. However, once the menu button 24 is depressed, icons are displayed as shown in FIG. 3(A) and at the same time the luminance level of the photographic image is lowered. If a cancel button 26 provided lower left of the LCD 14, shown in FIG. 1, is depressed, the menu display is cancelled and the luminance of the photographic image returns to the normal level.

In this manner, the luminance level of a photographic image is lowered during displaying character images, such as icons or letters. Accordingly, the character and photographic images are clearly distinguished from each other facilitating recognition of the character image.

In the reproduce mode, if the menu button 24 is depressed when a photographic image (still image) of a human figure is being displayed on the LCD 14 as shown in FIG. 4(A), "dust box" and "key" icons are displayed at upper left on the LCD 14. In also the reproduce mode, the luminance of the photographic image is reduced simultaneously with display of such a menu. The rotation of the menu button 24 causes the cursor to shift between the two icons. If the menu button 24 is depressed while the cursor is pointing at the "dust box" icon, an erase mode is established. On the other hand, when the menu button 24 is depressed when the cursor is pointing at the "key" icon, a protect mode is established.

If an erase mode is selected, display is made for letters inquiring whether to erase the current reproduced image as well as letters representative of a date of photographing on the LCD 14, as shown in FIG. 5(A). Incidentally, the luminance level of the photographic image is left low. If the menu button 24 is rotated to move the cursor to a "NO" side and the menu button is depressed, the state of display returns to a state shown in FIG. 4(A) without causing erasure of the photographic image. On the other hand, if the menu button 24 is depressed in a state that the cursor is pointing at "YES", letters indicative of being erased are displayed on the LCD 14 as shown in FIG. 5(C). Thereafter, a renewed image and a menu are displayed in the procedure shown in FIG. 6.

That is, the display of FIG. 5(C) is maintained until the erasure for the image data is completed. When the erasure is completed, the letters and the currently reproduced image are suspended of display. On the LCD 14 is displayed a black image. Thereafter, rendering is started for a next photographic image as shown in FIG. 6(A). The memory card 70 is recorded with image data compressed according to a JPEG method. Because it takes significant time to decompress this image data, the next photographic image is put into display little by little from the above. At this time, the luminance of the photographic image is increased up to the normal level. When the update is completed, the display is changed from a state of FIG. 6(B) to that of FIG. 6(C). That is, the luminance of the photographic image is reduced again and "dust box" and "key" icons are displayed at the upper left on the LCD 14.

Incidentally, where protection is made on the reproduced image, a key mark is displayed at the upper right on the LCD 14 as shown in FIGS. 5(A) and (B). In this state, the image data will not be erased even if the menu button 24 is depressed. In a state of FIG. 4(A) or (B) or FIG. 5(A) or (B), if the image switching button 16 is manipulated, the photographic image to be displayed on the LCD 14 is switched over. In this case, image renewal is also made in the procedure shown in FIG. 6.

When the menu button 24 is depressed in the state of FIG. 4(B), a protect mode is selected. On the LCD 14 are displayed letters inquiring whether to perform protection as well as letters indicative of a date of photographing the image being displayed, as shown in FIG. 7(A). When the cursor is aligned to "YES" and the menu button 24 is depressed, protection is made on the photographic image being displayed and a key mark representative of a protect state is displayed at the upper right on the LCD 14, as shown in FIG. 7(C). In the state that this key mark is on display, if the cursor is aligned to "NO" as shown in FIG. 7(B) and the menu button 24 is depressed, the protection is cancelled and the key mark disappears from the display.

Figure 6:
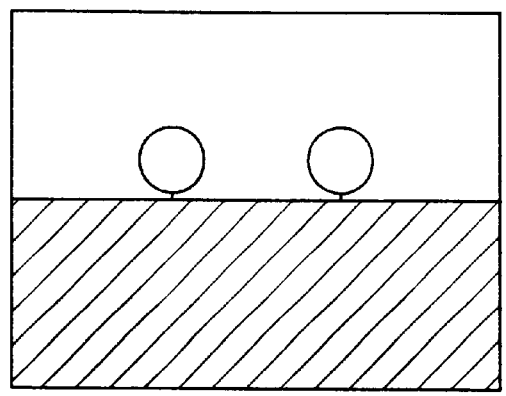
FIG. 6 is an illustrative view showing part of erase and protect mode operations in the FIG. 1 embodiment.
Figure 6:
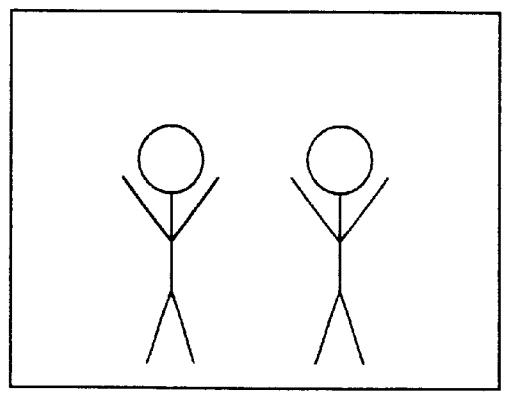
Figure 6:
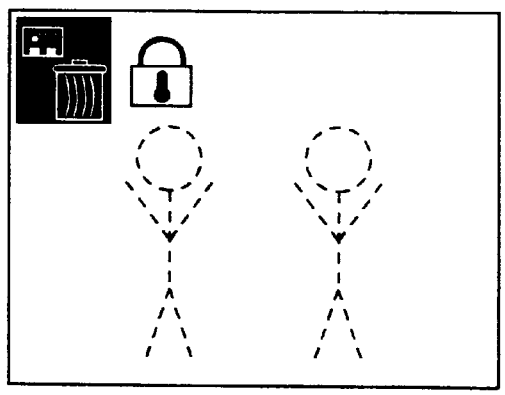

If the image switching button 16 is operated after completing a protection setting, image renewal is made in the procedure as shown in FIG. 6. That is, a black image is first displayed on the LCD 14 and then a renewal image with a normal luminance level is rendered little by little from the above. Then, the luminance level is lowered upon completion of the rendering, and "dust box" and "key" icons are put into display. Note that image switching i possible also in a display state of FIG. 4(A) or (B) or FIG. 7(A) or (B).

In also the reproduce mode, the luminance of the photographic image is reduced during displaying the character image, facilitating recognition of the character.

Figure 8:
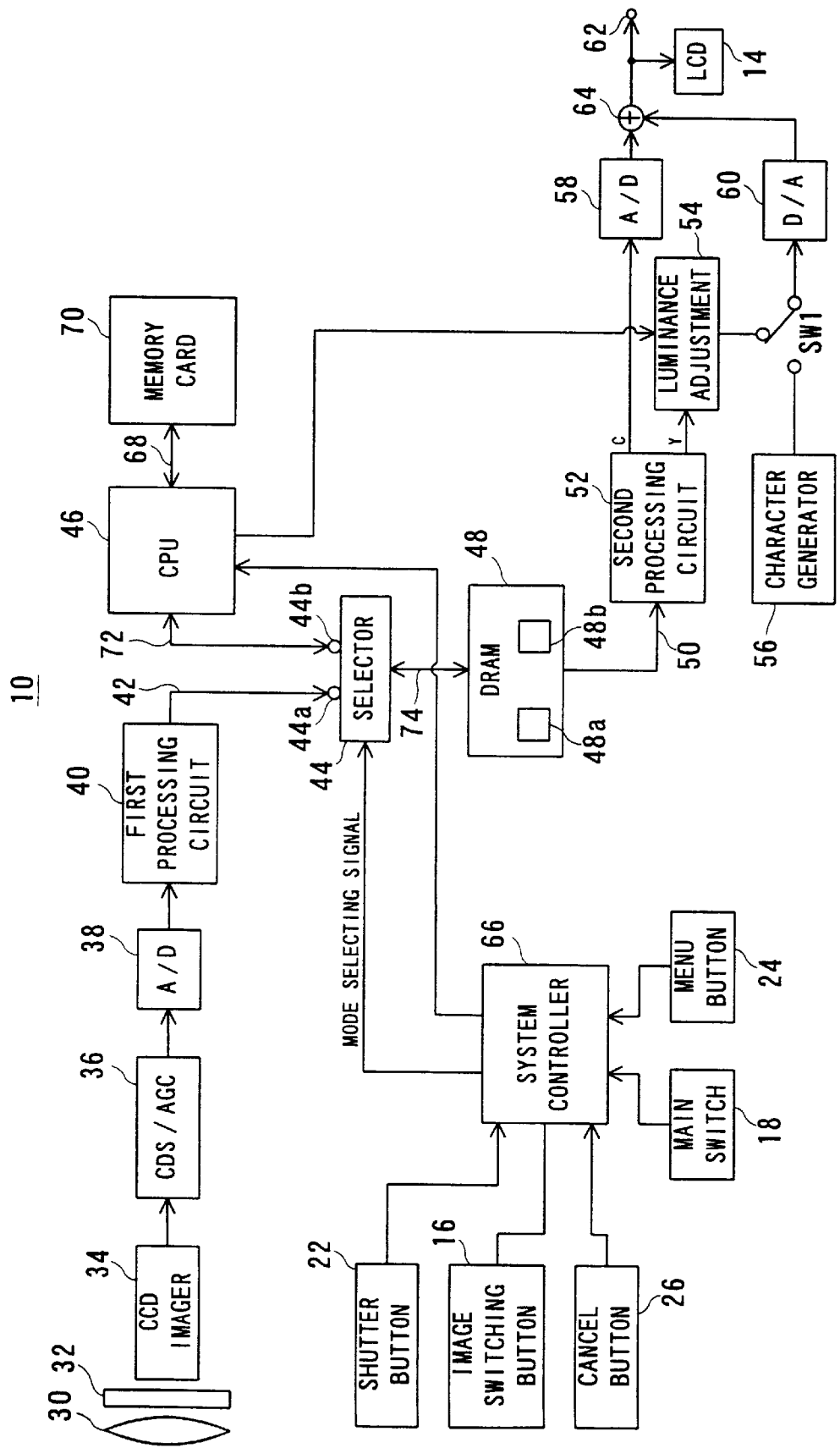
FIG. 8 is a block diagram showing the FIG. 1 embodiment.

The digital camera 10 is structured in detail as shown in FIG. 8. That is, a subject optical image is taken by a CCD imager 34 through a lens 30 and a complementary filter 32 of a mosaic type. In the camera mode, the CCD imager 34 performs a well-known pixel-mixing readout to provide a pixel signal to a CDS/AGC circuit 36. The CDS/AGC circuit 36 subjects the input pixel signal to well-known noise removal and level adjustment. The pixel signal processed by this CDS/AGC circuit 36 is converted by an A/D converter 38 into digital data or pixel data. This pixel data is processed of color separation and YUV conversion by a first signal processing circuit 40.

In the camera mode, a system controller 66 causes a selector 44 to select an input terminal 44a. Consequently, the YUV data obtained in the first signal processing circuit 40 is written into a memory area 48a of a DRAM 48 through buses 42 and 74. The CCD imager 34 adopts a progressive scan method, while an LCD 14 utilizes an interlace scan method. Due to this, the YUV data is temporarily written into the memory area 48a in order to convert the scanning process. The YUV data stored in the memory area 48a is read out by the interlace scan method and outputted to a second signal processing circuit 52 through the bus 50. The second signal processing circuit 52 creates C data and Y data from the YUV data thus inputted, and supplies the C data to a D/A converter 58 and the Y data to a luminance adjusting circuit 54. The luminance adjusting circuit 54 is controlled by a CPU 46 to thereby deliver a desired luminance level of the Y data to a D/A converter 60 through a switch SW1.

Figure 4:
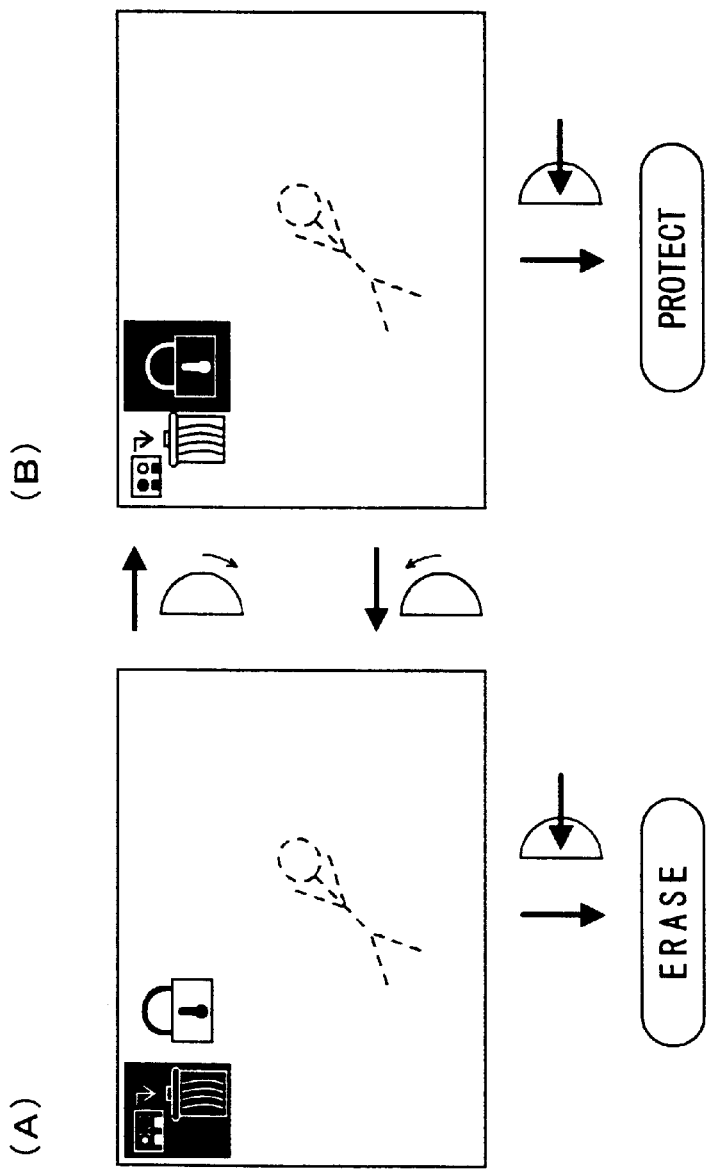
FIG. 4 is an illustrative view showing part of a reproduce mode operation in the FIG. 1 embodiment.
Figure 5:
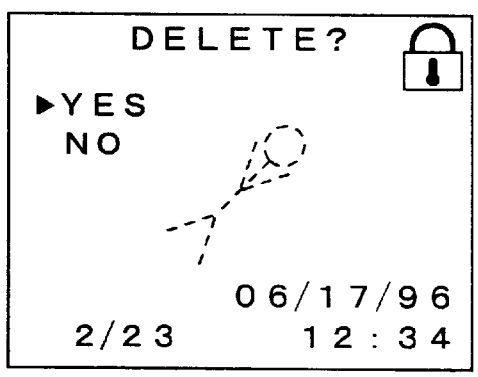
FIG. 5 is an illustrative view showing part of an erase mode operation in the FIG. 1 embodiment.
Figure 5:
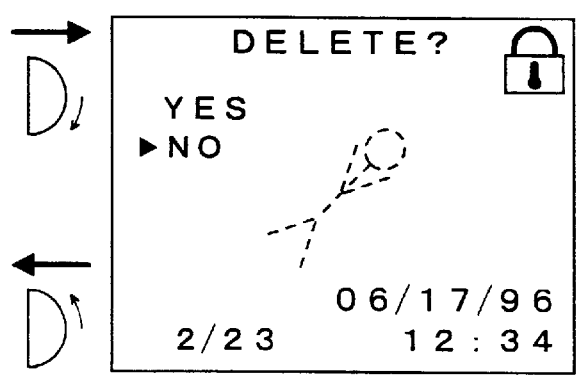
Figure 5:
Figure 5:
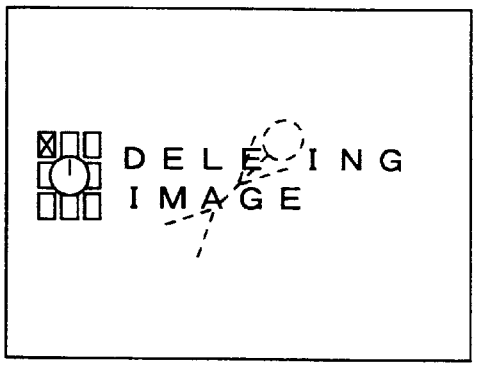
Figure 7:
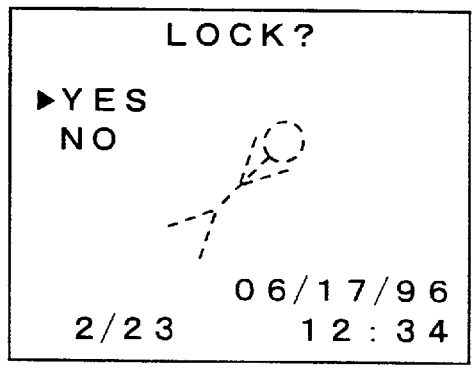
FIG. 7 is an illustrative view showing part of the protect mode operation in the FIG. 1 embodiment.
Figure 7:
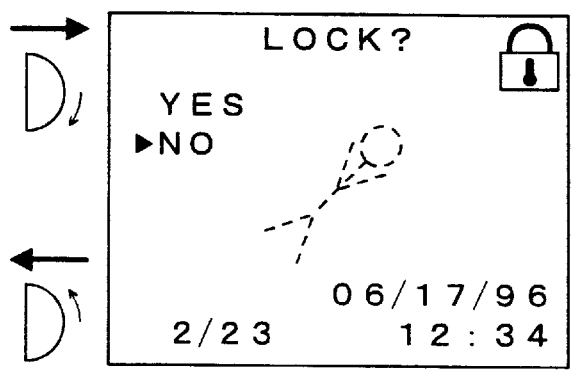
Figure 7:
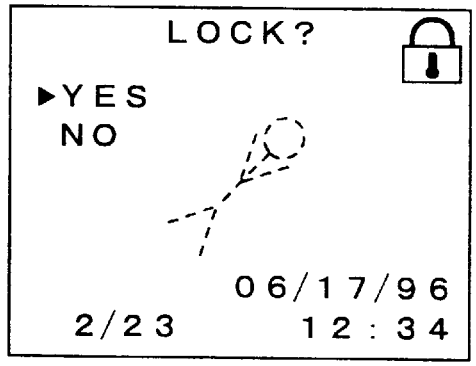

On the other hand, a character generator 56 outputs icons as shown in FIGS. 3 and 4, a key mark as shown in FIG. 7, key marks as shown in FIGS. 5 and 7, and character data such as of letters as shown in FIGS. 5 and 7. The switch SW1 is supplied also with this character data. The switch SW1 selects either one of the Y data or the character data under the control of the CPU 28. The C data outputted from the D/A converter 58 and the Y data or character data outputted from the D/A converter 60 are added together by an adder 64 so that an output of the adder is given to a terminal 62 and inputted as a motion image to the LCD 14. Consequently, only a photographic image is displayed on the LCD 14 before depressing the menu button 24. After depressing the menu button 24, the photographic image is superposed thereupon with character images such as icons or letters.

If a shutter button 22 is depressed by an operator, the system controller 66 controls the CCD imager 34 to carry out so-called all-pixel readout. This causes the CCD imager 34 to output pixel signals line by line. The CDS/AGC circuit 36 performs noise removal and level adjustment on the pixel signal in a manner similar to the above. The A/D converter 38, in turn, converts the pixel signal from the CDS/AGC circuit 36 into digital data, or pixel data. The CCD imager 34 is disabled after outputting 1 frame of the pixel signals. The 1-frame pixel data, i.e. photographic image data of a still image, is supplied directly onto the bus 42 without being processed by the first signal processing circuit 40. The selector 44 at this time has a selected terminal 44a so that the photographic image data is written into the memory area 48a. The CPU 46 performs YUV-conversion on the photographic image data in the memory area 48a with using a work area 48b, and compresses the converted YUV data, or the photographic image data, according to a JPEG format. The compressed image data is recorded onto a memory card 70 through the buses 72 and 68.

If a reproduce mode is established by the main switch 18, the selector 44 selects the terminal 44b. Due to this, the CPU 46 reads out desired compressed image data, and decompresses the compressed image data with using the work area 48b. The decompressed photographic image data (YUV data) is stored in the memory area 48a, and thereafter read out therefrom. The second signal processing circuit 52 and subsequent operate in the above stated manner, to thereby display a desired photographic image (reproduced image) and desired character images on the LCD 14.

Figure 9:
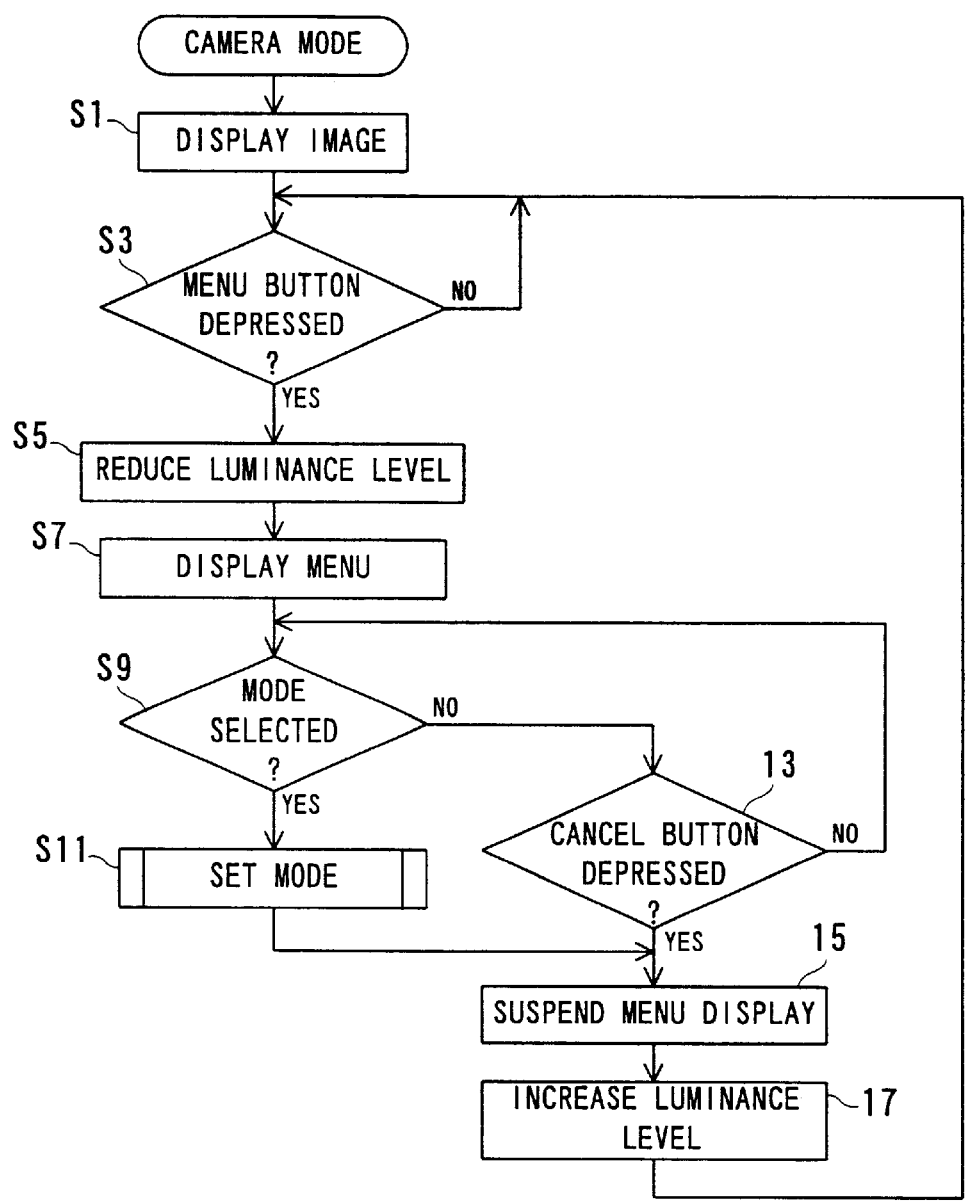
FIG. 9 is a flowchart showing part of the camera mode operation in the FIG. 1 embodiment.
Figure 10:
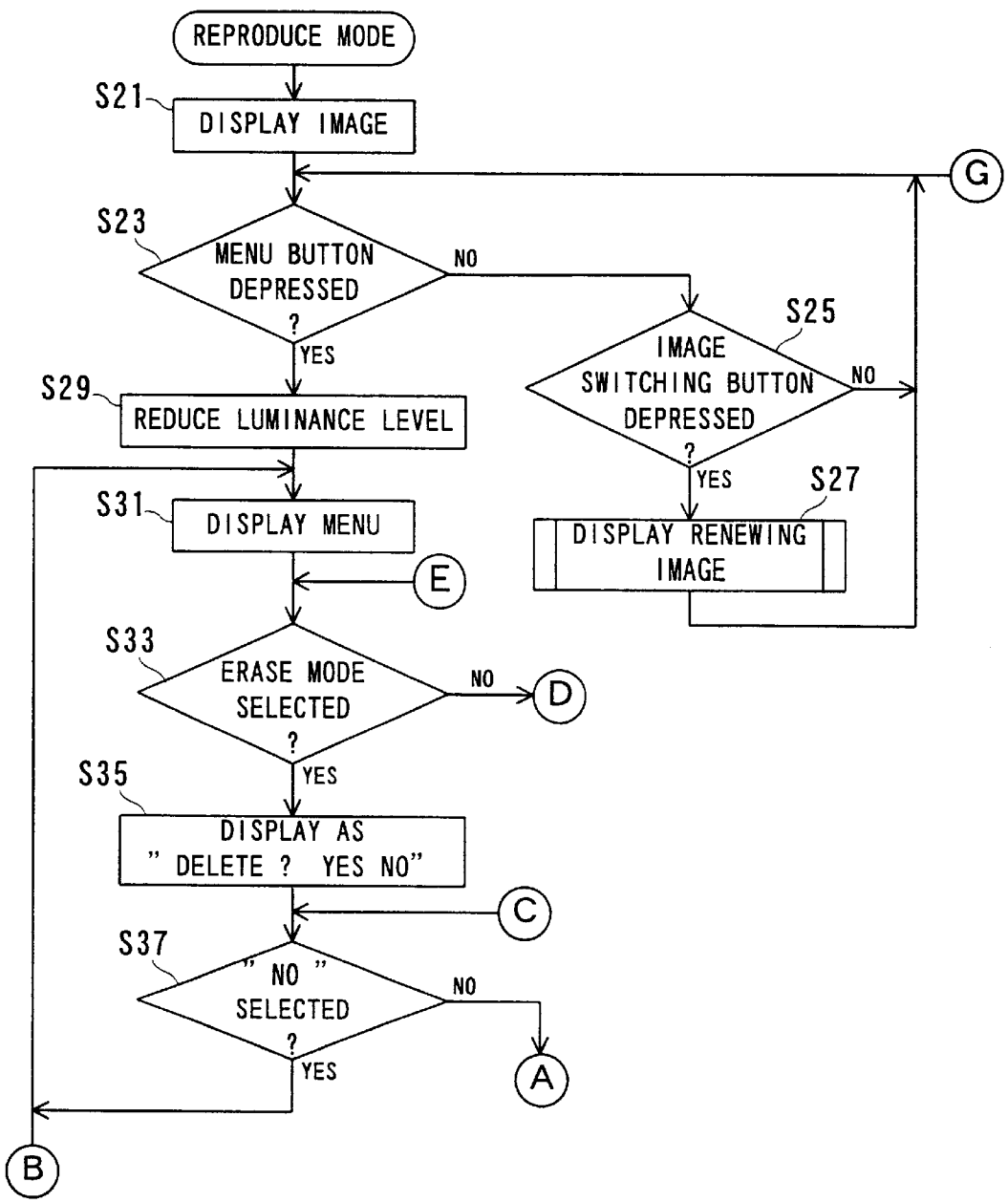
FIG. 10 is a flowchart showing part of the reproduce mode operation in the FIG. 1 embodiment.
Figure 11:
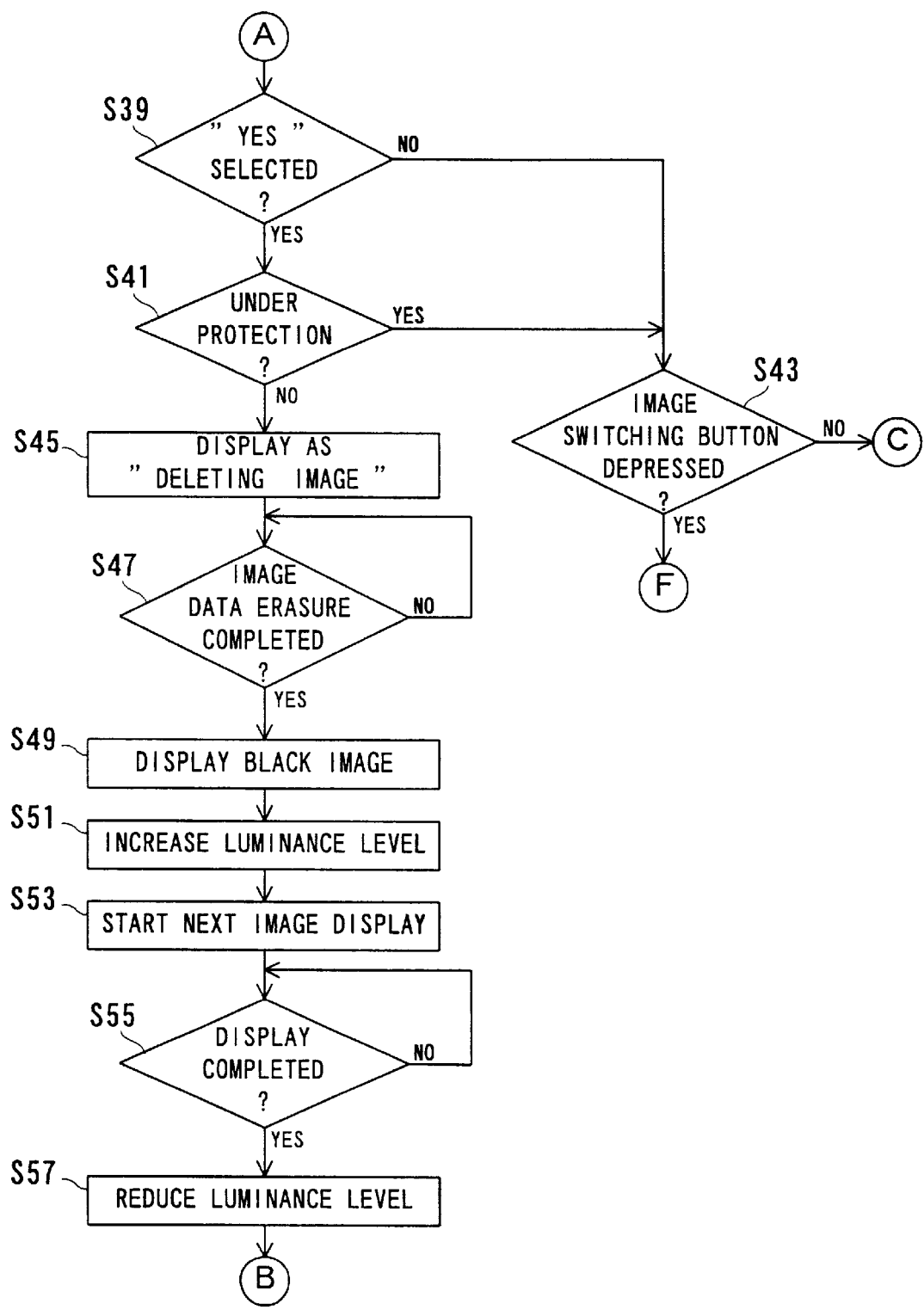
FIG. 11 is a flowchart showing another part of the reproduce mode operation in the FIG. 1 embodiment.
Figure 12:
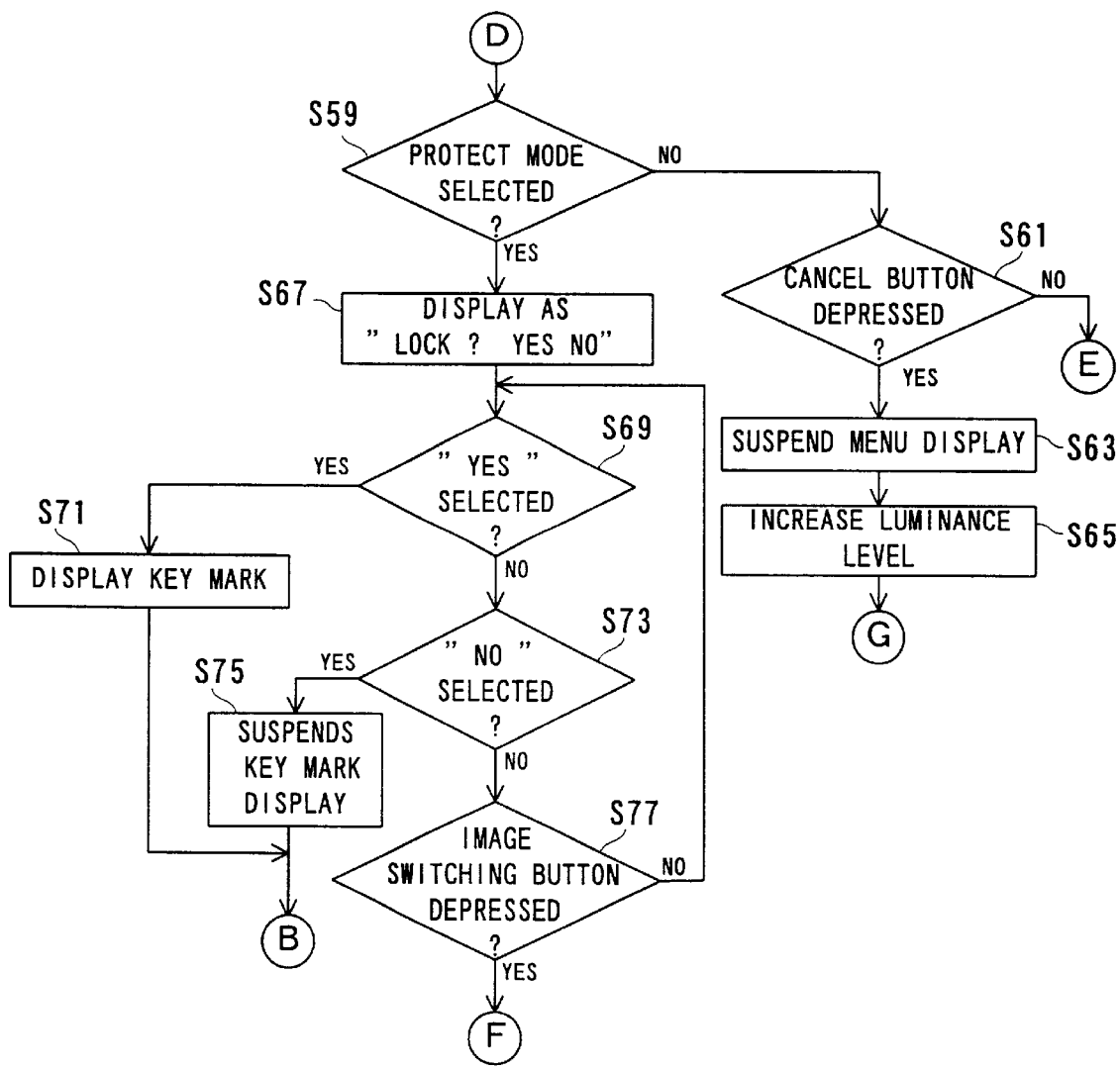
FIG. 12 is a flowchart showing another part of the reproduce mode operation in the FIG. 1 embodiment.
Figure 13:
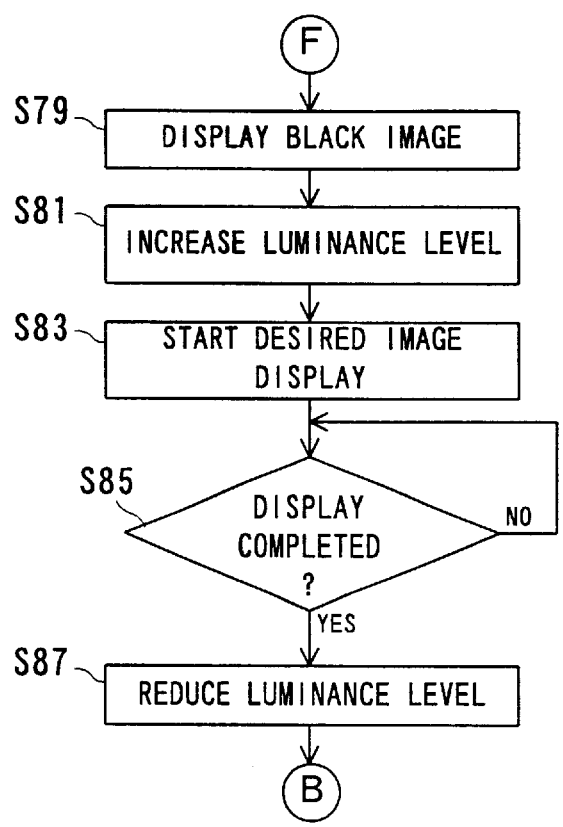
FIG. 13 is a flowchart showing still another part of the reproduce mode operation in the FIG. 1 embodiment.

The CPU 46 in the camera mode processes a flowchart shown in FIG. 9. First, at a step S1 a subject motion image, for example as shown in FIG. 3, is displayed at a normal luminance level. Then, at a step S3 it is determined whether the menu button 24 is depressed or not. If "NO", this luminance state is maintained, while if "YES", the luminance adjusting circuit 54 is controlled at a step S5 to reduce the luminance level. Then, at a step S7 a menu shown in FIG. 3(A) is displayed on the LCD 14. At the step S7, the switch SW1 is connected to the side of the character generator 56 only when the icon is to be displayed, i.e., only when outputting icon character data representative of a resolution or icon character data representative of a flash mode from the character generator 56. Due to this, icons and a subject image are displayed with a reduced luminance level on the LCD 14 as shown in FIG. 3(A).

The CPU 46 subsequently determines at a step S9 whether a flash mode or a desired resolution mode is selected or not. If "YES", the mode is set at a step S11 and the process proceeds to a step S15. At the step S15 the display of the menu is suspended, and the luminance level is increased at a step S17, and the process returns to the step S3. Specifically, the CPU 46 causes at the step S15 the switch SW1 to be connected at all times to the luminance adjusting circuit 54 side, and controls the luminance adjusting circuit 54 at a step S17 to bring the luminance level back to the normal level. Meanwhile, if "NO" at the step S9, it is determined at a step S13 whether the cancel button 26 has been depressed or not. If "NO" here, the process returns to the step S9, while if "YES", the process advances to the step S15.

Therefore, if a desired mode is established or the cancel button 26 is depressed when the image shown in FIG. 3(A) is being displayed, the icons disappear from the display and the motion picture only is displayed with an increased luminance level.

The CPU 46 in the reproduce mode processes flowchart shown in FIGS. 10 through 13. That is, at a step S21 a still reproduced image, for example as shown in FIG. 4, is displayed at a normal luminance level. Then, it is determined at a step S23 whether the menu button 24 is depressed or not. If "NO" here, it is determined at a step S25 whether the image switching button 16 is operated or not. If "NO", the process returns to the step S23. However, if "YES" at the step S25, a renewed image is displayed on the LCD 14 at the step S27, and the process returns to the step S23.

If "YES" at the step S23, the reproduced image is reduced in luminance level at a step S29, and icons of "dust box" and "key" are displayed at the upper left on the LCD 14 at a step S31. Accordingly, an image as shown in FIG. 4(A) is displayed on the LCD 14. Specifically, the switch SW1 is connected to a character generator 56 side only when the character data for these two icons is outputted from the character generator 56.

At a step S33 the CPU 46 determines whether the erase mode has been selected or not. If "YES" here, the CPU 46 at a step S35 outputs letter data shown in FIG. 5(A), and determines whether "NO" displayed on the LCD 14 has been selected at a step S37. If "YES" is determined, the process returns to the step S31, thereby displaying an image as shown in FIG. 4(A) on the LCD 14. On the other hand, if "NO" is determined at the step S37, the process proceeds to a step S39. At the step S39 it is determined whether "YES" displayed on the LCD 14 has been selected or not. At the subsequent step S41 it is determined whether the current reproduced image is under protection or not. If "YES" is determined at the step S39 and further "NO" is determined at the step S41, letter data as shown in FIG. 5(C) is displayed at a step S45, and compressed image data corresponding to the current reproduced image is erased from the memory card 70. At a step S47 it is determined whether the erasure of the image data has been completed or not. If "YES", the reproduced image is renewed. That is, the renewal process by a step S49 and the subsequent is enabled depending upon the determination "YES" at the step S47.

During renewal, a black image is first displayed on the LCD 14 at a step S49. At the step S49, the CPU 16 writes the data of the black image over the memory area 48a, and reads out this black image data. Also, the CPU 46 connects the switch SW1 at all times to a side of the luminance adjusting circuit 54. As a result, the current reproduced image and character images are halted of display.

Thereafter, the luminance adjusting circuit 54 is controlled at a step S51 to increase the luminance level up to the normal level. At a step S53 next photographic image data is decompressed to start display of the decompressed photographic image. As stated before, the memory card 70 is recorded with image data decompressed according to the JPEG method. This image data takes time to decompress. Due to this, the next photographic image is displayed little by little from an upper portion on the LCD 14. It is determined at a step S55 whether photographic image display, or photographic image renewal, has been completed or not. If "NO", the same determination is repeated, while if "YES", this photographic image is reduced in luminance level at a step S57, and the process returns to the step S31. These processes of the steps S49–S57 and S31 enable the next reproduced image with icons in a procedure as shown in FIGS. 6(A)–(C).

If "NO" is determined at the step S39 or otherwise "YES" is determined at the step S41, the CPU 46 at the step S43 determines whether the image switching button 16 is operated or not. If "NO" here, the process returns to the step S37, while if "YES", the reproduce image is renewed. The determination "YES" at the step S43 enables a renewal process by a step S79 and the subsequent of FIG. 13, similarly to the process stated before. The CPU 46 first displays a black image on the LCD 14 at the step S79, and then brings the luminance level of the reproduced image back to the normal level at a next step S81. Then desired image display, i.e., renewal, is started at a step S83. If the display has been completed is determined at a step S85, the luminance level is lowered at a step S87 and the process returns to the step S31. That is, if the image switching button 16 is operated in a state as shown in FIG. 5(A) or 5(B), a desired reproduced image with icons are displayed in a procedure as shown in FIGS. 6(A)–6(C).

Referring back to FIG. 10, if "NO" is determined at the step S33, the CPU 46 determines at a step S59 whether a protect mode has been selected or not. If "YES" here, that is, if the menu button 24 is depressed in a state shown in FIG. 4(B), the CPU at a step S67 outputs letter data as shown in FIG. 7(A). Subsequently, it is determined at a step S69 whether "YES" displayed on the LCD 14 is selected or not. If the determination here is "YES", a key mark is displayed, at a step S71, at an upper right on the LCD 14 as shown in FIG. 7(C) and protection is applied to the current reproduced image. Then, the process returns to the step S31. On the other hand, if "NO" is determined at the step S69, it is determined at a step S73 whether "NO" displayed on the LCD 14 has been selected or not. If "YES" is determined here, the key mark is suspended of display and the protection for the current reproduced image is cancelled. Thereafter, the process returns to the step S31. If "NO" is determined at the step S73, it is determined at a step S77 whether the image switching button 16 is operated or not. If "NO", the process returns to the step S69. However, if "YES", the process advances to a step S79. By the processes of the step S79 and the subsequent, an image is displayed on the LCD 14 in a procedure as shown in FIGS. 6(A)–(C).

If the determination at the step S59 is "NO", the CPU 46 determines at a step S61 whether the cancel button 26 is depressed or not. If "NO" here, the CPU 46 returns the process to the step S33. However, "YES", the menu display is suspended at the step S63 and the luminance level is increased to the normal level at the step S65, returning the process to the step S23. Accordingly, if the cancel button 26 is depressed, a human figure image shown in FIG. 5 only is displayed at the normal luminance level.

Incidentally, the digital camera according to this invention is applicable not only to so-called digital still cameras for recording only still images but also to so-called video movies for recording motion images. Where this invention is applied to a video movie, it can be considered that reproduced images be reduced in luminance in response to menu operations during motion image reproduction. Also, in this embodiment the switch SW1 was used to combine the character data with the image Y data. Alternatively, an adder may be employed in place of the switch SW1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera comprising:
   an image monitor;
   a displayer which displays a photographic image on said image monitor;
   an inputer which inputs a character display command;
   a superposer which superposes a character image on the photographic image in response to the character display command;
   a first luminance reducer which reduces a luminance of the photographic image in response to the character display command;
   a renewer which renews the photographic image;
   a first luminance increaser which increases for a predetermined time period from a start of renewal of the luminance reduced by said first luminance reducer; and
   a second luminance reducer which reduces the luminance after a lapse of the predetermined time period, wherein the predetermined time period is a time period required for the renewal and recognition of the photographic image.

2. A digital camera according to claim 1, wherein the photograph image is a still image reproduced from a memory.

3. A digital camera according to claim 2, wherein said memory is stored with compressed image data configured by the photographic image compressed by a predetermined method, and said renewer includes a decompressor to decompress the compressed image data by the predetermined method.

4. A digital camera according to claim 1, further comprising a display suspender which suspends display of the character image and the photographic image prior to the renewal.

5. A digital camera according to claim 4, further comprising a character redisplayer which redisplays the character image after the lapse of the predetermined period.

6. A digital camera according to claim 1, wherein the predetermined time period is a time period required for the renewal.

7. A digital camera according to claim 2, further comprising an eraser which erases the photographic image recorded on said memory, and a first enabler which enables said renewer when the photographic image is erased by said eraser.

8. A digital camera according to claim 1, further comprising an instructor which instructs to switch the photographic image displayed on said image monitor, and a second enabler which enables said renewer depending upon an output of said instructor.

9. A digital camera according to claim 1, wherein the photographic image displayed on said image monitor is a motion image photographed in real time.

10. A digital camera according to claim 1, further comprising a canceller which cancels display of he character image, and a second luminance increaser which increases the luminance depending upon an output of said canceller.

11. A digital camera which displays a photographic image based on photographic image data reproduced from a memory on an image monitor at a low luminance level and superposes a character image on the photographic image comprising:

a renewer for renewing the photographic image;

a canceller for canceling display of the character image prior to the renewal by said renewer;

a luminance increaser for increasing a luminance level of the photographic image for a predetermined time period from a start of the renewal by said renewer;

a luminance reducer for reducing the luminance level of the photographic image after a lapse of the predetermined time period; and a redisplayer for redisplaying the character image after the lapse of the predetermined time period, wherein the predetermined time period is a time period required for the renewal and recognition of the photographic image.

12. A digital camera which displays a photographic image based on photographic image data reproduced from a memory on an image monitor at a low luminance level and superposes a character image on the photographic image comprising:

a renewer for renewing the photographic image;

a luminance increaser for increasing a luminance level of the photographic image for a predetermined time period from a start of the renewal by said renewer; and a luminance reducer for reducing the luminance level of the photographic image after a lapse of the predetermined time period, wherein the photographic image data is still image data, and the predetermined time period is a time period required for the renewal and recognition of the photographic image.

13. A digital camera for displaying on an image monitor with a low luminance a photographed still image based on photographed still image data reproduced from a memory and superposing a character on the photographed still image comprising:

an adjuster for adjusting a luminance level of the photographed still image data;

a renewer for renewing the photographed still image displayed on said image monitor;

a first instructor for instructing said adjuster to increase the luminance level at a time of said renewer starting renewing process;

a second instructor for instructing said adjuster to decrease the luminance level at a time of said renewer finishing the renewing process.

14. A digital camera according to claim 13, wherein the photographed still image data is recorded on said memory in a compressed state.

15. A digital camera according to claim 13, further comprising an eraser for erasing the photographed still image data corresponding to the photographed image being displayed on said image monitor, wherein said renewer is enabled when the photographed still image data is erased by said eraser.

16. A digital camera according to claim 13, further comprising an instructor for instructing to switch the photographed still image displayed on said image monitor, wherein said renewer is enabled depending upon an output of said instructor.

* * * * *